United States Patent
Park et al.

(10) Patent No.: US 10,528,167 B2
(45) Date of Patent: Jan. 7, 2020

(54) CONDUCTIVE STRUCTURE, METHOD FOR MANUFACTURING SAME, TOUCH PANEL COMPRISING SAME AND DISPLAY DEVICE COMPRISING SAME

(71) Applicant: LG CHEM, LTD., Seoul (KR)

(72) Inventors: Chan Hyoung Park, Daejeon (KR); Jin Hyuk Min, Daejeon (KR); Song Ho Jang, Daejeon (KR); Jin Woo Park, Daejeon (KR); Ki-Hwan Kim, Daejeon (KR); Ilha Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 109 days.

(21) Appl. No.: 15/738,557

(22) PCT Filed: Jul. 14, 2016

(86) PCT No.: PCT/KR2016/007643
§ 371 (c)(1),
(2) Date: Dec. 20, 2017

(87) PCT Pub. No.: WO2017/010816
PCT Pub. Date: Jan. 19, 2017

(65) Prior Publication Data
US 2018/0164932 A1 Jun. 14, 2018

(30) Foreign Application Priority Data
Jul. 14, 2015 (KR) .................. 10-2015-0099917

(51) Int. Cl.
*G06F 3/041* (2006.01)
*G06F 3/044* (2006.01)

(52) U.S. Cl.
CPC .......... *G06F 3/0412* (2013.01); *G06F 3/044* (2013.01); *G06F 2203/04112* (2013.01)

(58) Field of Classification Search
CPC .... G06F 3/04; G06F 2203/04112; G06F 1/16; G06F 3/0412; G06F 2203/04103; G06F 3/044; G06F 3/041; G06F 3/0488; G06F 3/03545; G06F 2203/04111; G06F 2203/04804; B32B 15/04; B32B 15/20; B32B 27/00; B32B 27/06; B32B 15/08; B32B 2255/10; B32B 2457/20; B32B 2307/202; B32B 2307/40; B32B 2307/416; B32B 2457/208; B32B 2255/28; H01B 1/026
See application file for complete search history.

(56) References Cited

U.S. PATENT DOCUMENTS

| 9,766,652 B2 | 9/2017 | Lim et al. |
| 2006/0148962 A1* | 7/2006 | Bersted .................. C08K 3/013 524/495 |
| 2014/0066543 A1 | 3/2014 | Cho et al. |

(Continued)

FOREIGN PATENT DOCUMENTS

| KR | 10-2014-0030075 | 3/2014 |
| KR | 10-2015-0061608 | 6/2015 |

(Continued)

*Primary Examiner* — Vinh T Lam
(74) *Attorney, Agent, or Firm* — Dentons US LLP

(57) ABSTRACT

The present specification relates to a conductive structure body, a manufacturing method thereof, a touch panel including the same, and a display device including the same.

18 Claims, 3 Drawing Sheets

(56) References Cited

U.S. PATENT DOCUMENTS

| | | |
|---|---|---|
| 2014/0272455 A1 | 9/2014 | Ding et al. |
| 2015/0123942 A1* | 5/2015 | Huang .................... G06F 3/044 345/174 |
| 2015/0205326 A1 | 7/2015 | Lim et al. |
| 2015/0370359 A1 | 12/2015 | Lim et al. |
| 2016/0048242 A1 | 2/2016 | Ahn et al. |
| 2017/0227694 A1* | 8/2017 | Nakanishi ................. B32B 7/02 |
| 2017/0255296 A1* | 9/2017 | Takiguchi ............... G06F 3/044 |

FOREIGN PATENT DOCUMENTS

| | | | |
|---|---|---|---|
| WO | 2012036453 | | 3/2012 |
| WO | 2012157938 | | 11/2012 |
| WO | 2014035207 | | 3/2014 |
| WO | WO2014035207 | * | 3/2014 |
| WO | 2014157841 | | 10/2014 |

* cited by examiner

[Fig 1]
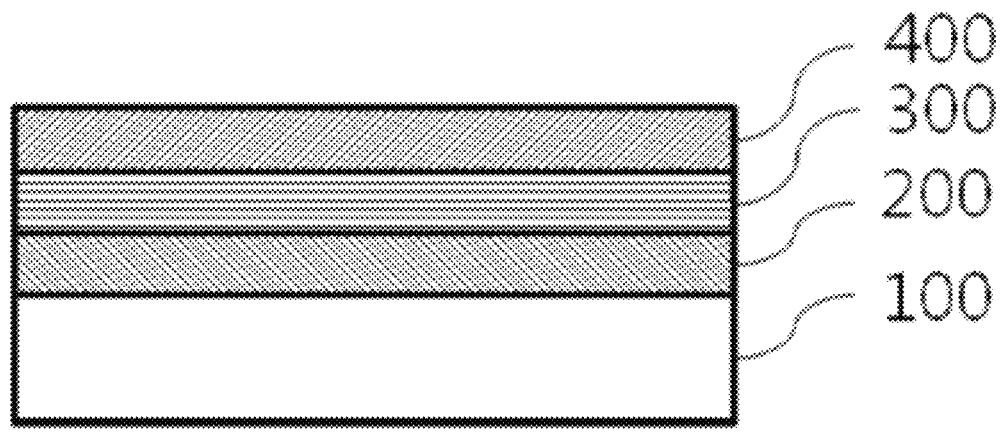
[Fig 2]
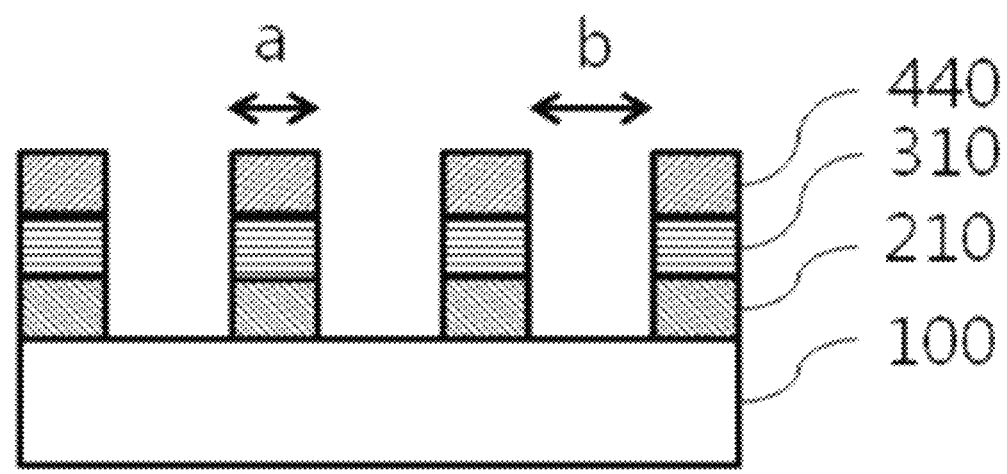

[Fig 3]
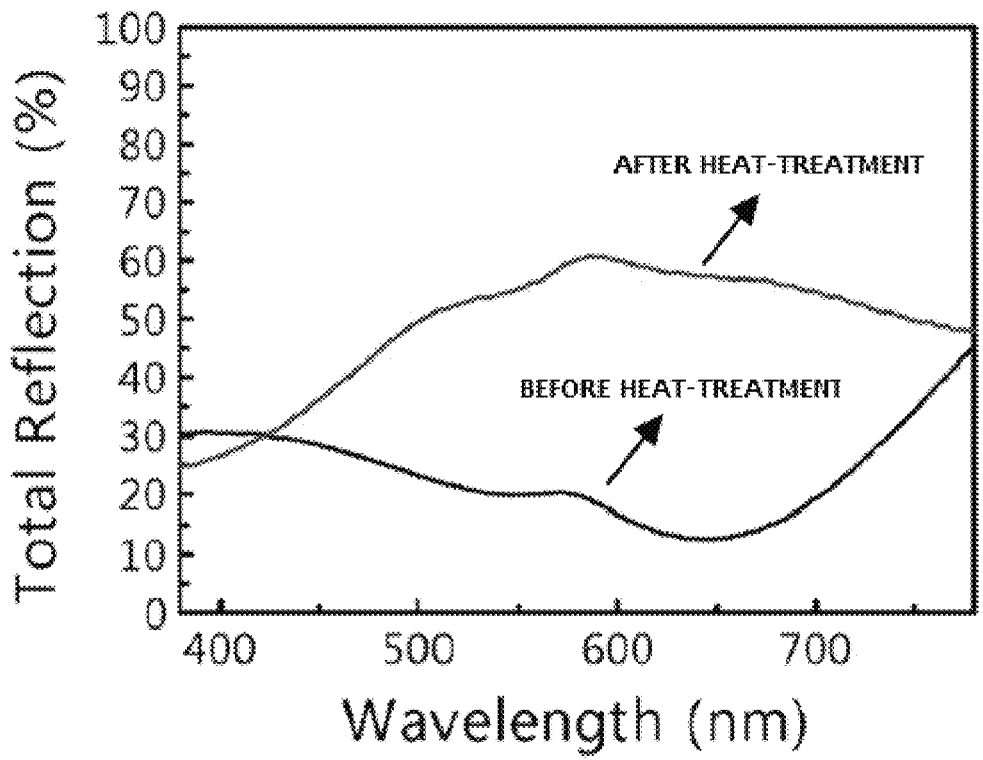
[Fig 4]
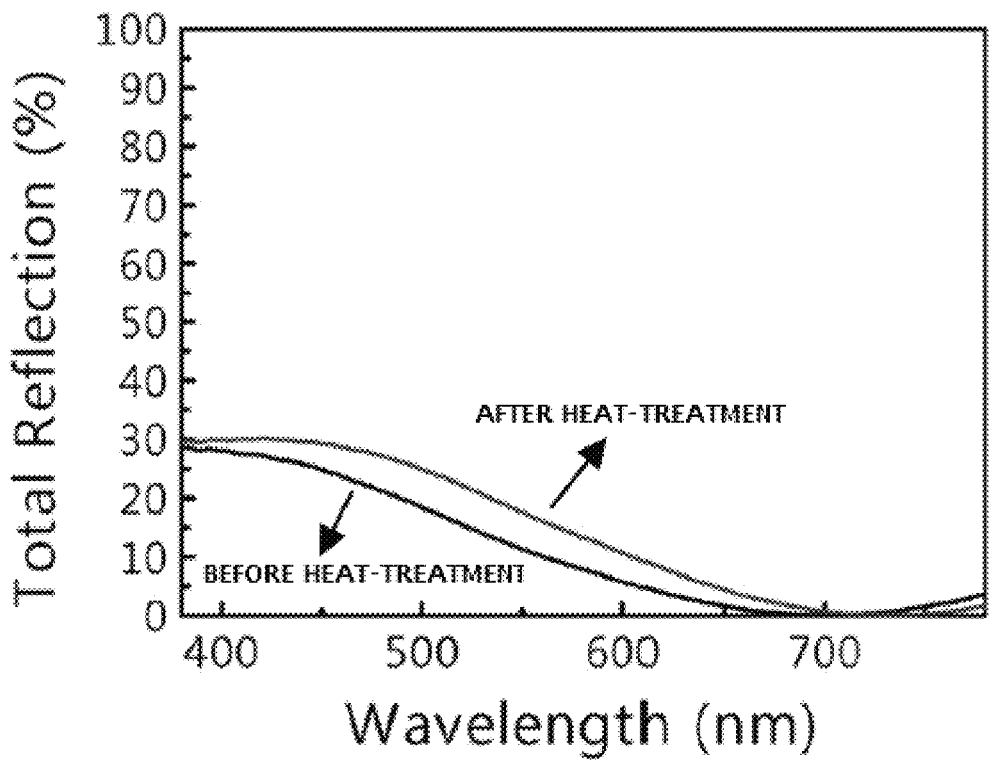

[Figure 5]

| | Ni content (at%) of discoloration preventing layer | Batch-etching result |
|---|---|---|
| Comparative Example 10 | 40 at% | |
| Example 6 | 50 at% | |
| Example 7 | 57 at% | |
| Example 8 | 72 at% | |
| Comparative Example 11 | 82 at% | |

CONDUCTIVE STRUCTURE, METHOD FOR MANUFACTURING SAME, TOUCH PANEL COMPRISING SAME AND DISPLAY DEVICE COMPRISING SAME

TECHNICAL FIELD

This application is a National Stage Application of International Application No. PCT/KR2016/007643 filed on Jul. 14, 2016, which claims priority to and the benefit of Korean Patent Application No. 10-2015-0099917 filed in the Korean Intellectual Property Office on Jul. 14, 2015, both of which are incorporated herein in their entirety by reference for all purposes as if fully set forth herein.

The present specification relates to a conductive structure body, a manufacturing method thereof, a touch panel including the same, and a display device including the same.

BACKGROUND ART

In general, touch panels may be classified as below according to a detection method of a signal. That is, the touch panel includes a resistive type that senses a location pressed by pressure while applying direct current (DC) voltage through a change in current or voltage value, a capacitive type using capacitance coupling while applying alternating current (AC) voltage, an electromagnetic type that senses a selected location through the change in voltage while applying a magnetic field, and the like.

In recent years, technological development has been required, which may embody a large touch screen panel which is excellent in visibility while reducing resistance of an electrode as the need for a large-area touch screen panel increases.

DETAILED DESCRIPTION OF THE INVENTION

Technical Problem

An object to be solved by the present specification is to provide a conductive laminate having excellent visibility, which may be applied to a display device.

Technical Solution

An embodiment of the present specification provides a conductive structure body including: a substrate; a metal layer including copper provided on the substrate; a discoloration preventing layer provided on the metal layer and including copper and nickel; and a light reflection reducing layer provided on the discoloration preventing layer and including at least one of copper oxide, copper nitride, copper oxynitride, aluminum oxide, aluminum nitride, and aluminum oxynitride, in which a nickel content of the discoloration preventing layer is in the range of 50 at % to 80 at %.

An embodiment of the present specification provides a method for manufacturing a conductive structure body, including: preparing a substrate; forming a metal layer including copper on the substrate; forming a discoloration preventing layer including copper and nickel on the metal layer; and forming a light reflection reducing layer on the discoloration preventing layer.

An embodiment of the present specification provides a touch panel including the conductive structure body.

An embodiment of the present specification provides a display device including the conductive structure body.

Advantageous Effects

A conductive structure body according to an embodiment of the present specification has an advantage in maintaining excellent electrical conductivity and effectively preventing a glare effect of a metal layer.

The conductive structure body according to the embodiment of the present specification has an advantage in excellent visibility and excellent thermal stability.

The conductive structure body according to the embodiment of the present specification can minimize an increase in light reflectivity of the conductive structure body depending on a process environment when being applied to an electronic element such as a display device.

The conductive structure body according to the embodiment of the present specification has an advantage in significantly reducing process cost because the conductive structure body can be manufactured through one etching process.

BRIEF DESCRIPTION OF DRAWINGS

FIG. 1 illustrates a laminated structure of a conductive structure body according to an embodiment of the present specification.

FIG. 2 illustrates the laminated structure when the conductive structure body according to the embodiment of the present specification is patterned.

FIG. 3 illustrates light reflectivity before and after heat treatment of a conductive structure body according to Comparative Example 1.

FIG. 4 illustrates light reflectivity before and after heat treatment of a conductive structure body according to Example 1. FIG. 5 illustrates Batch-etching characteristic comparison of a conductive structure body according to Example 2.

EXPLANATION OF REFERENCE NUMERALS AND SYMBOLS

100: Substrate
200: Metal layer
210: Metal pattern layer
300: Discoloration preventing layer
310: Discoloration preventing pattern layer
400: Light reflection reducing layer
410: Light reflection reducing pattern layer
a: Line width of pattern layer
b: Line interval between adjacent conductive lines of pattern layer

[Best Mode]

In the present specification, when it is described that a member is positioned on another member, the member may "contact" the other member or a third member may be interposed between both members.

In the present specification, unless explicitly described to the contrary, the word "comprise" and variations such as "comprises" or "comprising", will be understood to imply the inclusion of stated elements but not the exclusion of any other elements.

Hereinafter, the present specification will be described in more detail.

In the present specification, a display device as a term which collectively refers to a TV or a computer monitor includes a display element that forms an image and a case that supports the display element.

As the display element, a plasma display panel (PDP), a liquid crystal display (LCD), an electrophoretic display, a cathode-ray tube (CRT), an OLED display, and the like may be exemplified. In the display element, RGB pixel patterns and additional optical filters for embodying the image may be provided.

Meanwhile, with respect to the display device, as distribution of smart phones, tablet PCs, IPTVs, and the like is accelerated, a need for a touch function in which a human's hand become a direct input device without a separate input device such as a keyboard or a remote controller has been gradually increased. Further, a multi-touch function capable of handwriting as well as specific point recognition has been required.

Currently, most of the commercialized touch screen panels (TSPs) are based on transparent conductive ITO thin films, but at the time of applying the large-area touch screen panel, there are problems in that a touch recognition speed is decreased because of an RC delay due to a relatively high sheet resistance (a minimum of 150 Ω/sq, ELECRYSTA product manufactured by Nitto Denko Corporation) of an ITO transparent electrode itself and an additional compensation chip for overcoming the problem needs to be introduced.

The present inventors studied a technology for replacing the transparent ITO thin film with a metal fine pattern. As a result, the present inventors found that in the case of using a metal thin film having high electric conductivity as an electrode use of the touch screen panel, when a fine electrode pattern having a specific shape is embodied, in terms of visibility due to high reflectivity, a problem in that the pattern is well viewed by the human eye and glaring due to high reflectivity, a haze value, and the like against external light may occur. Further, in a manufacturing process, the present inventors found that a target value is expensive or the process is complicated in many cases.

Further, in the case of using a metal fine line as a transparent electrode, the largest issue may be a reflective color. Due to a unique gloss of metal, a visibility problem such as a glare caused by an external light source may occur, and thus an additional layer capable of reducing reflection needs to be formed on the metal surface.

Further, since a metal fine line prepared with predetermined line width and pitch has a characteristic in which light is transmitted to most of the area while having low electric resistance, the metal fine line has been actively studied as a next-generation transparent electrode and touch sensor.

In particular, among them, Cu metal fine lines are considered to be suitable materials for implementing metal fine lines at low cost and high electrical conductivity. The aforementioned metal-specific visibility issue may be reduced by depositing an oxide film on the metal. However, in a structure in which $CuO_x$ is deposited on Cu metal, the $Cu/CuO_x$ interface becomes unstable due to a high diffusion property of Cu when a high temperature post-process is performed after deposition, thereby causing an issue in reflection color.

Accordingly, the present specification aims to maximize stability at high temperature while embodying an appropriate color of the conductive structure body including a metal layer and a light reflection reducing layer.

An embodiment of the present specification provides a conductive structure body including: a substrate; a metal layer including copper, which is provided on the substrate; a discoloration preventing layer provided on the metal layer and including copper and nickel; and a light reflection reducing layer provided on the discoloration preventing layer and including at least one of copper oxide, copper nitride, copper oxynitride, aluminum oxide, aluminum nitride, and aluminum oxynitride, and a nickel content of the discoloration preventing layer is in the range of 50 at % to 80 at %.

FIG. 1 illustrates a laminated structure of a conductive structure body according to an embodiment of the present specification. Specifically, according to FIG. 1, the conductive structure body includes a metal layer 200, a discoloration preventing layer 300, and a light reflection reducing layer 400 sequentially provided on a substrate 100. However, the conductive structure body is not limited to a structure of FIG. 1 and an additional layer may be further provided.

The light reflection reducing layer means a layer capable of reducing the amount of light incident in a metal layer itself and the amount of light reflected from the metal layer with light absorbance.

In the embodiment of the present specification, the discoloration preventing layer serves to prevent performance of the light reflection reducing layer from being degraded as copper of the metal layer is diffused to the light reflection reducing layer.

A conductive structure body in the related art may include a structure in which the metal layer including the copper and the light reflection reducing layer including copper oxide are laminated. However, when the conductive structure body including the laminated structure of Cu and CuO is heat-treated at 150° C. under atmospheric pressure, an issue that light reflectance of the conductive structure body increases and a light reflection reduction capability deteriorates occurs. Such an issue occurs from an interface of Cu and CuO and in particular, it is determined that such an issue occurs by a phenomenon in which CuO is changed to $Cu_2O$. That is, there is an issue in that the performance of the light reflection reducing layer deteriorates as Cu of the metal layer is diffused to the light reflection reducing layer during a heat-treatment process. Such modification on the Cu/CuO interface leads to the increase in light reflectance of the conductive structure body and a change in color of the light reflection reducing layer, and as a result, such modification may be an issue in the process of manufacturing and evaluating a fine line product in the future.

A diffusion coefficient between Cu and CuO at 150° C. as $1.3 \times 10^{-20}$ m$^2$/s has a larger value than $6.85 \times 10^{-31}$ m$^2$/s which is the diffusion coefficient between Cu and Cu. Therefore, it can be seen that Cu is diffused to the CuO interface at a temperature of 150° C. and the Cu/CuO interface is modified.

The conductive structure body according to the embodiment of the present specification includes the discoloration preventing layer between the metal layer including the copper and the light reflection reducing layer to prevent the copper of the metal layer from being diffused to the light reflection reducing layer. As a result, there is a characteristic that stability at a high temperature may be maximized by preventing Cu of the metal layer from being diffused to the light reflection reducing layer.

According to the embodiment of the present specification, a content of nickel of the discoloration preventing layer may be 57 at % or more.

When the content of nickel of the discoloration preventing layer is less than 50 at %, the light reflectivity on the surface of the light reflection reducing layer after the heat-treatment may significantly increase.

Further, when the content of nickel of the discoloration preventing layer is equal to or more than 50 at %, the increase in light reflectivity on the surface of the light reflection reducing layer after the heat-treatment may be effectively suppressed. More specifically, when the content of nickel of the discoloration preventing layer is equal to or more than 57 at %, the increase in light reflectivity on the surface of the light reflection reducing layer after the heat-treatment may be suppressed to a minimum.

Furthermore, when the content of nickel of the discoloration preventing layer is in the range of 50 at % to 80 at %, excellent etchability is exhibited, and as a result, collective etching is possible together with the metal layer and the light reflection reducing layer. When the content of the nickel of the discoloration preventing layer is out of the range, the etchability decreases, and as a result, there is an issue in that it is difficult to form a conductive line having a minute line width when the collective etching is performed together with the metal layer and the light reflection reducing layer.

According to the embodiment of the present specification, a thickness of the discoloration preventing layer may be in the range of 10 nm to 30 nm. Specifically, according to the embodiment of the present specification, the thickness of the discoloration preventing layer may be in the range of 10 nm to 20 nm.

When the thickness of the discoloration preventing layer is less than 10 nm, the diffusion of Cu from the metal layer to the light reflection reducing layer during the heat-treatment may not be effectively blocked, and as a result, the performance of the light reflection reducing layer may significantly deteriorate.

According to the embodiment of the present specification, a difference between the average reflectance at a wavelength in the range of 380 nm to 780 nm on the surface of the light reflectance reduction layer after the heat-treatment at 150° C. for 24 hours and the average reflectance at the wavelength in the range of 380 nm to 780 nm on the surface of the light reflectance reduction layer before the heat-treatment may be 12% or less.

According to the embodiment of the present specification, the difference between the average reflectance at the wavelength in the range of 380 nm to 780 nm on the surface of the light reflectance reduction layer after the heat-treatment at 150° C. for 24 hours and the average reflectance at the wavelength in the range of 380 nm to 780 nm on the surface of the light reflectance reduction layer before the heat-treatment may be 10% or less.

The heat-treatment may adopt a general box oven and in this case, relative humidity may be approximately 20%.

According to the embodiment of the present specification, the light reflection reducing layer may include the copper oxide, and an oxygen content of the light reflection reducing layer may be in the range of 30 at % to 50 at %. According to the embodiment of the present specification, the light reflection reducing layer may include the copper oxide, and the oxygen content of the light reflection reducing layer may be in the range of 33 at % to 50 at %.

According to the embodiment of the present specification, the thickness of the light reflection reducing layer may be in the range of 10 nm to 100 nm. Specifically, according to the embodiment of the present specification, the thickness of the light reflection reducing layer may be in the range of 20 nm to 60 nm. Specifically, according to the embodiment of the present specification, the thickness of the light reflection reducing layer may be in the range of 30 nm to 40 nm.

When the thickness of the light reflection reducing layer is within the range, it may be comparatively advantageous in terms of process control and a production speed. Further, when the thickness of the light reflection reducing layer is within the range, total reflection of the conductive structure body in light having the wavelength of 380 nm to 780 nm may be 20% or less, specifically 15% or less, and more specifically 10% or less, and as a result, a light reflection reduction effect is excellent. In addition, when the thickness of the light reflection reducing layer is within the range, an effect of preventing erosion of the metal layer is excellent and it easy to pattern the light reflection reducing layer with a uniform line width and a uniform thickness.

When the thickness of the light reflection reducing layer is more than 100 nm, an issue may occur in that it is difficult to pattern the light reflection reducing layer.

An average extinction coefficient k of the conductive structure body according to the embodiment of the present specification in a visible-ray area may be in the range of 0.2 to 1.5 and specifically in the range of 0.4 to 1.0. When the average extinction coefficient k is 0.2 or more, light reflection of the metal layer may be effectively controlled.

The average extinction coefficient k may also be referred to as an absorption coefficient and the average extinction coefficient k as a scale to define how strongly the conductive structure body absorbs light in a specific wavelength is an element for determining the transmittance of the conductive structure body.

The extinction coefficient may be measured by using Ellipsometer measurement equipment, and the like known to the art.

According to the embodiment of the present specification, an average refractive index of the light reflection reducing layer in the visible-ray area may be 2 to 3. Specifically, the visible-ray area may mean a wavelength zone of the area of 380 nm to 780 nm.

According to the embodiment of the present specification, the average reflectance of the conductive structure body in the light having the wavelength of 380 nm to 780 nm may be 20% or less. Specifically, the average reflectance of the conductive structure body in the light having the wavelength of 380 nm to 780 nm may be 15% or less or 10% or less.

According to the embodiment of the present specification, the average reflectance of the conductive structure body may mean reflectance on the surface of the light reflection reducing layer.

Further, according to the embodiment of the present specification, the total reflection of the conductive structure body in the light having the wavelength of 380 nm to 780 nm may be 20% or less. Specifically, the total reflection of the conductive structure body in the light having the wavelength of 380 nm to 780 nm may be 15% or less or 10% or less.

According to the embodiment of the present specification, the total reflection means reflectance for light of an area of the wavelength in the range of 300 nm to 800 nm, specifically, 380 nm to 780 nm, which is incident in a surface to be measured at 90 after treating a surface opposite to a surface to be measured with a perfect black. In the present specification, the total reflection is a value measured based on the light of the area in the wavelength range of 300 nm to 800 nm, specifically, 380 nm to 780 nm in reflected light reflected by a target pattern layer in which the light is incident or the conductive structure body when the incident light is set to 100%.

According to the embodiment of the present specification, the metal layer may be a metal pattern layer and the light reflection reducing layer may be a light reflection reducing pattern layer. In this case, when the total reflection of the conductive structure body is measured on a second surface side of the light reflection reducing layer, the total reflection Rt of the conductive structure body may be calculated by Equation 1 given below.

Total reflection $Rt$=reflectance of substrate+closure rate×reflectance of light reflection reducinglayer [Equation 1]

Further, when two conductive structure body types are laminated as a configuration of the conductive structure body, the total reflection Rt of the conductive structure body may be calculated by Equation 2 given below.

Total reflection $Rt$=reflectance of substrate+closure rate×reflectance of light reflection reducing layer×2 [Equation 2]

In Equations 1 and 2 given above, the total reflection of the substrate may be reflectance of touch tempered glass and when the surface is a film, the total reflection may be the reflectance of the film.

Further, the closure rate may be represented as an area ratio which an area covered by a conductive pattern occupies based on a plane of the conductive structure body, that is, (1−aperture ratio).

According to the embodiment of the present specification, a brightness value L* of the conductive structure body may be 50 or less on the basis of a CIE (Commission Internationale de l'Eclairage) L * a * b * color coordinate, more specifically, 40 or less. There is an advantageous effect in that as the brightness value is smaller, the reflectance is lower.

According to the embodiment of the present specification, the metal layer may be a metal pattern layer including a plurality of openings and a conductive line partitioning the plurality of openings.

According to the embodiment of the present specification, the discoloration preventing layer may be a discoloration preventing pattern layer provided on the metal pattern layer.

According to the embodiment of the present specification, the light reflection reducing layer may be the light reflection reducing pattern layer provided on the discoloration preventing pattern layer.

According to the embodiment of the present specification, the metal pattern layer, the discoloration preventing pattern layer, and the light reflection reducing pattern layer may form a regular pattern or an irregular pattern. Specifically, the metal pattern layer, the discoloration preventing pattern layer, and the light reflection reducing pattern layer may be provided while forming the pattern on the substrate through a patterning process.

Specifically, the pattern may have polygonals including a triangle, a quadrangle, and the like, a circle, an ellipse, or an amorphous shape. The triangle may be an equilateral triangle or a right triangle and the quadrangle may be a square, a rectangle, or a trapezoid.

As the regular pattern, a pattern shape in the art, such as a mesh pattern, or the like may be used. The irregular pattern is not particular limited, but the irregular pattern may be boundary shapes of figures constituting a Voronoi diagram. According to the embodiment of the present specification, when the pattern shape is set as the irregular pattern, a diffraction pattern of reflected light by an illumination having directivity may be removed by the irregular pattern and an influence by light scattering may be minimized by the light reflection reducing pattern layer, thereby minimizing an issue in visibility.

FIG. 2 illustrates the laminated structure when the conductive structure body is patterned according to the embodiment of the present specification. Specifically, according to FIG. 2, the conductive structure body includes a metal pattern layer 210, a discoloration preventing pattern layer 310, and a light reflection reducing pattern layer 410 sequentially provided on the substrate 100. However, the conductive structure body is not limited to a structure of FIG. 2 and an additional layer may be further provided.

In FIG. 2, a means the line width of the pattern layer and b means a line interval between adjacent conductive lines of the pattern layer.

According to the embodiment of the present specification, the line width of the metal pattern layer may be in the range of 0.1 μm to 100 μm. Specifically, according to the embodiment of the present specification, the line width of the metal pattern layer may be in the range of 0.1 μm to 50 μm and in the range of 0.1 μm to 30 μm or in the range of 0.1 μm to 10 μm, but the line width of the metal pattern layer is not limited only thereto. The line width of the metal pattern layer may be designed according to a final use of the conductive structure body.

When the line width is less than 0.1 μm, it may be difficult to embody the pattern and when the line width is more than 100 μm, the visibility may deteriorate.

The light reflection reducing pattern layer may have a pattern having the same shape as the metal pattern layer. However, a pattern scale of the light reflection reducing pattern layer need not be completely the same as that of the metal pattern layer and a case where the line width of the pattern in the light reflection reducing pattern layer is smaller or larger than the line width of the pattern in the metal pattern layer is also included in the scope of the present specification. Specifically, the line width of the pattern in the light reflection reducing pattern layer may be in the range of 80% to 120% of the line width of the pattern in the metal pattern layer. Further, an area with the pattern in the light reflection reducing pattern layer may be in the range of 80% to 120% of the area with the pattern in the metal pattern layer. More particularly, a pattern shape of the light reflection reducing pattern layer may be a pattern shape having a line width which is equal to or larger than the line width of the pattern of the metal pattern layer.

When the light reflection reducing pattern layer has a pattern shape having a line width which is larger than the line width of the metal pattern layer, the light reflection reducing pattern layer may largely give an effect of covering the metal pattern layer when viewed from the user, and thus, there is an advantage in that an effect by luster or reflection of the metal pattern layer itself may be efficiently blocked. However, even though the line width of the pattern in the light reflection reducing pattern layer is the same as the line width of the pattern in the metal pattern layer, the present specification may achieve a desired effect.

According to the embodiment of the present specification, the line interval of the adjacent conductive lines of the metal pattern layer may be in the range of 0.1 to 100 μm. According to the embodiment of the present specification, the line interval may be 0.1 μm or more, more particularly 10 μm or more, and even more particularly 20 μm or more. Further, according to the embodiment of the present specification, the line interval may be 100 μm or less and more particularly 30 μm or less.

According to the embodiment of the present specification, since the metal pattern layer, the light reflection reducing pattern layer may be embodied by patterns having fine line widths, when the metal pattern layer and the light reflection reducing pattern layer are used as an electrode of the touch panel of the display element, there is an advantage in that the visibility is excellent.

In the conductive structure body according to the embodiment of the present specification, the substrate may use a transparent substrate, but is not particularly limited, and for example, the substrate may use glass, a plastic substrate, a plastic film, and the like.

According to the embodiment of the present specification, a transparent conductive layer may be further provided between the substrate and the metal layer. Specifically, according to the embodiment of the present specification, the transparent conductive layer may be provided in contact with one surface of the substrate. Further, according to the embodiment of the present specification, the metal layer may be provided on the transparent conductive layer.

According to the embodiment of the present specification, a transparent conductive oxide layer may be used as the transparent conductive layer. The transparent conductive oxide may use indium oxide, zinc oxide, indium tin oxide, indium zinc oxide, indium zinc tin oxide, an amorphous transparent conductive polymer, etc., and use one kind or all of two kinds or more thereof, but is not limited thereto. According to the embodiment of the present specification, the transparent conductive layer may be an indium tin oxide layer.

According to the embodiment of the present specification, the transparent conductive layer may be a transparent electrode layer.

The "transparency" of the present specification means that transmittance of visible-rays is 70% or more or 80% or more.

According to the embodiment of the present specification, the thickness of the transparent conductive layer may be 15 nm or more and 20 nm or less, but is not limited thereto. The transparent conductive layer may be formed by using the aforementioned material for the transparent conductive layer through a deposition process or a printing process.

According to the embodiment of the present specification, the substrate is not particularly limited and may use a material which is known in the art. According to the embodiment of the present specification, the transparent substrate may adopt all transparent substrates, and for example, may be glass, polyethylene terephthalate (PET), polycarbonate (PC) or polyamide (PA).

According to the embodiment of the present specification, sheet resistance of the conductive structure body may be 0.1 Ω/square or more and 100 Ω/square or less, particularly 1 Ω/square or more and 50 Ω/square or less, and more particularly 1 Ω/square or more and 20 Ω/square or less.

When the sheet resistance of the conductive structure body is 1 Ω/square or more and 100 Ω/square or less, there is an effect in that the conductive structure body may substitute for an ITO transparent electrode and particularly, when the sheet resistance of the conductive structure body is 1 Ω/square or more and 50 Ω/square or less or 1 Ω/square or more and 20 Ω/square or less, the sheet resistance is significantly low as compared with when the ITO transparent electrode in the related art is used. Thus, there are advantages in that when a signal is applied, the RC delay becomes shorter, and as a result, the touch recognition speed may be significantly improved and a touch screen having a large area of 10 inches or more is easily applied based on the improvement.

An embodiment of the present specification provides a method for manufacturing a conductive structure body, including: preparing a substrate; forming a metal layer including copper on the substrate; forming a discoloration preventing layer including copper and nickel on the metal layer; and forming a light reflection reducing layer on the discoloration preventing layer.

The manufacturing method according to the embodiment of the present specification may further include patterning at least one of the metal layer, the discoloration preventing layer, and the light reflection reducing layer.

According to the embodiment of the present specification, the forming of the metal pattern layer, the discoloration preventing pattern layer, and the light reflection reducing pattern layer may adopt a method known in the art. For example, the metal pattern layer, the discoloration preventing pattern layer, and the light reflection reducing pattern layer may be formed by a method such as deposition, sputtering, wet coating, evaporation, electroplating or electroless plating, and lamination of a metal film and particularly, may be formed by a sputtering method.

According to the embodiment of the present specification, the forming of the discoloration preventing layer and/or the light reflection reducing layer may adopt a physical deposition method. Specifically, the forming of the discoloration preventing layer and/or the light reflection reducing layer may adopt a sputtering method, an E-beam deposition method, or an evaporation deposition method. For example, when the discoloration preventing layer and/or the light reflection reducing layer is formed, inert gas, for example, gas such as Ar may be used as sputtering gas. Further, when a reactive sputtering method is used, a process may be performed by controlling partial pressure of reactive gas such as $O_2$.

According to the embodiment of the present specification, the forming of the light reflection reducing layer may adopt a sputtering method under an atmosphere having oxygen partial pressure of 30% or more. Specifically, according to the embodiment of the present specification, the sputtering method may be performed under an atmosphere having oxygen partial pressure of 50% or more.

The manufacturing method according to the embodiment of the present specification may further include patterning at least one of the metal layer, the discoloration preventing layer, and the light reflection reducing layer.

The method for patterning the metal layer, the discoloration preventing layer and/or the light reflection reducing layer may adopt a method known in the art and is not particularly limited. For example, in order to pattern the metal layer, a photoresist method may be used. In detail, the method may use a method of forming a photoresist pattern on the metal layer by selective exposure and development or forming a resist pattern by a printing method, and selectively etching a metal layer which is not coated with the resist pattern by using the resist pattern as a mask. The manufacturing method according to the embodiment of the present specification may further include patterning at least one of the metal layer, the discoloration preventing layer, and the light reflection reducing layer.

The manufacturing method according to the embodiment of the present specification may further include simultaneously patterning the metal layer, the discoloration preventing layer, and the light reflection reducing layer.

According to the embodiment of the present specification, in the simultaneous patterning, the metal layer, the discoloration preventing layer, and the light reflection reducing layer may be batch-etched by using an etchant.

In the manufacturing method according to the embodiment of the present specification, when the light reflection reducing layer includes copper, since the metal layer, the discoloration preventing layer, and the light reflection reducing layer may be etched by using the same etchant, there is also the advantage in that the metal layer, the discoloration preventing layer, and the light reflection reducing layer may be batch-etched.

Specifically, the etchant may be a Cu etchant and the Cu etchant generally used in the art may be used without a limit.

An embodiment of the present specification provides a touch panel including the conductive structure body. The touch panel may be a touch screen panel. For example, in a capacitive touch screen panel, the conductive structure body according to the embodiment of the present specification may be used as a touch sensitive electrode substrate.

Further, the embodiment of the present specification provides a display device including the touch panel.

The touch screen panel according to the embodiment of the present specification may further include an additional structure body other than the aforementioned conductive structure body. In this case, two structure bodies may be disposed in the same direction, or may be disposed in directions opposite to each other. Two or more structure bodies that may be included in the touch screen panel need not to have the same structure, and any one, preferably, only the structure body closest to the user may just include the aforementioned conductive structure body, and an additional structure body may not include the light reflection reducing layer. Further, layer-laminated structures in the two or more structure bodies may be different from each other. When two or more structure bodies are included, an insulating layer may be provided therebetween. In this case, the insulating layer may additionally have a function as an adhesive layer.

The touch screen panel according to the embodiment of the present specification may include a lower substrate; an upper substrate; and an electrode layer provided on any one surface or two surfaces of a surface of the lower substrate contacting the upper substrate and a surface of the upper substrate contacting the lower substrate. The electrode layers may perform a function for detecting an X-axial position and a Y-axial position, respectively.

In this case, one or both of the electrode layer provided on the lower substrate and the surface of the lower substrate contacting the upper substrate; and the electrode layer provided on the upper substrate and the surface of the upper substrate contacting the lower substrate may be the conductive structure body according to the aforementioned embodiment of the present specification. In the case where only one of the electrode layers is the conductive structure body according to the embodiment of the present specification, the other electrode layer may have a conductive pattern which is known in the art.

In the case where the electrode layers are provided on one-side surfaces of both the upper substrate and the lower substrate to form an electrode layer of the two layers, an insulating layer or a spacer may be provided between the lower substrate and the upper substrate so that a distance between the electrode layers is uniformly maintained and the electrode layers are not connected to each other. The insulating layer may include an adhesive or a UV or thermosetting resin. The touch screen panel may further include a ground portion connected to the pattern of the metal layer in the aforementioned conductive structure body. For example, the ground portion may be formed at an edge of the surface with the pattern of the metal layer of the substrate. Further, at least one of an anti-reflective film, a polarization film, and an anti-fingerprinting film may be provided on at least one surface of a laminate including the conductive structure body. According to a design specification, different kinds of functional films may further be included in addition to the aforementioned functional films. The touch screen panel may be applied to display devices such as an OLED display panel, a liquid crystal display (LCD), a cathode-ray tube (CRT), and a PDP.

In the touch screen panel according to the embodiment of the present specification, the conductive pattern layer and a darkening pattern layer may be provided on both surfaces of the substrate, respectively.

The touch screen panel according to the embodiment of the present specification may additionally include an electrode portion or a pad portion on the conductive structure body. In this case, an effective screen portion, the electrode portion, and the pad portion may be configured by the same conductive body.

In the touch screen panel according to the embodiment of the present specification, the light reflection reducing pattern layer may be provided at a side which is viewed by the user.

The embodiment of the present specification provides a display device including the conductive structure body. In the display device, the conductive structure body according to the embodiment of the present specification may be used in a color filter substrate, a thin film transistor substrate, or the like.

The embodiment of the present specification provides a solar cell including the conductive structure body. For example, the solar cell may include an anode electrode, a cathode electrode, a photoactive layer, a hole transporting layer and/or an electron transporting layer, and the conductive structure body according to the embodiment of the present specification may be used as the anode electrode and/or the cathode electrode.

The conductive structure body may replace conventional ITO in the display device or the solar cell and may be used as a flexible application. Further, the conductive structure body may be used as a next-generation transparent electrode together with CNT, a conductive polymer, graphene, or the like.

Hereinafter, the present specification will be described in detail with reference to Examples for a specific description. However, the Examples according to the present specification may be modified in various different forms, and it is not interpreted that the scope of the present specification is limited to the Examples described in detail below. The Examples of the present specification will be provided for more completely explaining the present specification to those skilled in the art.

[Mode For Invention]

Comparative Example 1

After a polyethylene terephthalate (PET) substrate was prepared, a metal layer having a thickness of 100 nm was formed on the PET substrate using Cu as a source material under an argon atmosphere of 2 mTorr. The conductive structure body was manufactured by forming the light reflection reducing layer of copper oxide without forming the discoloration preventing layer on the metal layer.

The change of the light reflectance in the visible-ray area after heat-treating the conductive structure body manufactured according to Comparative Example 1 at 150° C. for 24 hours is measured and shown in FIG. 3.

Experimental Examples 1-1 to 1-4 are used for finding optical characteristics before and after the heat-treatment of the conductive structure body and the patterning process is omitted.

[Experimental Example 1-1] Optical Characteristic Result Before and after Heat-treatment After a polyethylene terephthalate (PET) substrate was prepared, a metal layer having a thickness of 100 nm was formed on the PET substrate using Cu as a source material under an argon atmosphere of 2 mTorr. Furthermore, the conductive structure body was manufactured by forming a Cu—Ni discoloration preventing layer in which an Ni content is 26 at % on the metal layer by using the sputtering method under an atmosphere having oxygen of 50% and thereafter, forming the light reflection reducing layer of the copper oxide on the discoloration preventing layer.

An increased degree of average light reflectance in the wavelength of 380 nm to 780 nm after heat-treating the conductive structure body at the temperature of 150 C for each of 30 minutes and 24 hours by manufacturing the conductive structure body by controlling the discoloration preventing layer to each of 1 nm, 5 nm, 10 nm, and 20 nm was measured. A result thereof is shown in Table 1 below.

[Experimental Example 1-2] Optical Characteristic Result Before and after Heat-treatment After a polyethylene terephthalate (PET) substrate was prepared, a metal layer having a thickness of 100 nm was formed on the PET substrate using Cu as a source material under an argon atmosphere of 2 mTorr. Furthermore, the conductive structure body was manufactured by forming a Cu—Ni discoloration preventing layer in which an Ni content is 40 at % on the metal layer by using the sputtering method under an atmosphere having oxygen of 50% and thereafter, forming the light reflection reducing layer of the copper oxide on the discoloration preventing layer.

An increased degree of average light reflectance in the wavelength of 380 nm to 780 nm after heat-treating the

TABLE 1

|  | Comparative Example 2 | Comparative Example 3 | Comparative Example 4 | Comparative Example 5 |
| --- | --- | --- | --- | --- |
| Thickness of discoloration preventing layer | 1 nm | 5 nm | 10 nm | 20 nm |
| Average light reflectance before heat-treatment (%) | 18.19 | 16.83 | 15.69 | 14.58 |
| Average light reflectance after heat-treatment for 30 minutes (%) | 24.46 | 20.27 | 19.23 | 18.28 |
| Average light reflectance after heat-treatment for 24 hours (%) | Measurement is impossible | Measurement is impossible | Measurement is impossible | Measurement is impossible |
| Difference in average light reflectance before and after heat-treatment for 30 minutes | 6.27 | 3.45 | 3.53 | 3.7 |
| Difference in average light reflectance before and after heat-treatment for 24 hours | — | — | — | — |

In the conductive structure bodies according to Comparative Examples 2 to 5 after the heat-treatment for 24 hours, even a lower metal layer was oxidized and changed to a semi-transparent state, and as a result, it was difficult to measure the average reflectance.

conductive structure body at the temperature of 150 C for each of 30 minutes and 24 hours by manufacturing the conductive structure body by controlling the discoloration preventing layer to each of 1 nm, 5 nm, 10 nm, and 20 nm was measured. The result thereof is shown in Table 2 below.

TABLE 2

|  | Comparative Example 6 | Comparative Example 7 | Comparative Example 8 | Comparative Example 9 |
| --- | --- | --- | --- | --- |
| Thickness of discoloration preventing layer | 1 nm | 5 nm | 10 nm | 20 nm |
| Average light reflectance before heat-treatment (%) | 19.62 | 16.23 | 14.61 | 13.03 |
| Average light | 23.89 | 19.23 | 17.04 | 15.07 |

TABLE 2-continued

|  | Comparative Example 6 | Comparative Example 7 | Comparative Example 8 | Comparative Example 9 |
|---|---|---|---|---|
| reflectance after heat-treatment for 30 minutes (%) | | | | |
| Average light reflectance after heat-treatment for 24 hours (%) | Measurement is impossible | Measurement is impossible | Measurement is impossible | 25.52 |
| Difference in average light reflectance before and after heat-treatment for 30 minutes | 4.27 | 3.00 | 2.44 | 2.04 |
| Difference in average light reflectance before and after heat-treatment for 24 hours | — | — | — | 12.49 |

In the conductive structure bodies according to Comparative Examples 6 to 8 after the heat-treatment for 24 hours, even a lower metal layer was oxidized and changed to a semi-transparent state, and as a result, it was difficult to measure the average reflectance. Further, in the case of the conductive structure body according to Comparative Example 9, the difference in the average light reflectance before and after the heat treatment for 24 hours exceeded 12%, so that the discoloration of the light reflection reducing layer was not effectively prevented.

[Experimental Example 1-3] Optical Characteristic Result Before and after Heat-treatment After a polyethylene terephthalate (PET) substrate was prepared, a metal layer having a thickness of 100 nm was formed on the PET substrate using Cu as a source material under an argon atmosphere of 2 mTorr. Furthermore, the conductive structure body was manufactured by forming a Cu—Ni discoloration preventing layer in which an Ni content is 50 at % on the metal layer by using the sputtering method under an atmosphere having oxygen of 50% and thereafter, forming the light reflection reducing layer of the copper oxide on the discoloration preventing layer.

An increased degree of average light reflectance in the wavelength of 380 nm to 780 nm after heat-treating the conductive structure body at the temperature of 150 C for each of 30 minutes and 24 hours by manufacturing the conductive structure body by controlling the discoloration preventing layer to each of 10 nm and 20 nm was measured. The result thereof is shown in Table 3 below.

TABLE 3

|  | Example 1 | Example 2 |
|---|---|---|
| Thickness of discoloration preventing layer | 10 nm | 20 nm |
| Average light reflectance before heat-treatment (%) | 14.26 | 12.58 |
| Average light reflectance after heat-treatment for 30 minutes (%) | 16.78 | 14.69 |
| Average light reflectance after heat-treatment for 24 hours (%) | 25.92 | 22.98 |

TABLE 3-continued

|  | Example 1 | Example 2 |
|---|---|---|
| Difference in average light reflectance before and after heat-treatment for 30 minutes | 2.52 | 2.11 |
| Difference in average light reflectance before and after heat-treatment for 24 hours | 11.66 | 10.40 |

In the case of the conductive structure bodies according to Examples 1 and 2, it is shown that the difference in the average light reflectance before and after the heat treatment for 24 hours is within 12%, so that the discoloration of the light reflection reducing layer was effectively prevented.

For reference, FIG. 4 illustrates light reflectivity before and after heat treatment of a conductive structure body according to Example 1.

[Experimental Example 1-4] Optical Characteristic Result Before and after Heat-Treatment After a polyethylene terephthalate (PET) substrate was prepared, a metal layer having a thickness of 100 nm was formed on the PET substrate using Cu as a source material under an argon atmosphere of 2 mTorr. Furthermore, the conductive structure body was manufactured by forming a Cu—Ni discoloration preventing layer in which an Ni content is 57 at % on the metal layer by using the sputtering method under an atmosphere having oxygen of 50% and thereafter, forming the light reflection reducing layer of the copper oxide on the discoloration preventing layer.

An increased degree of average light reflectance in the wavelength of 380 nm to 780 nm after heat-treating the conductive structure body at the temperature of 150 C for each of 30 minutes and 24 hours by manufacturing the conductive structure body by controlling the discoloration preventing layer to each of 5 nm, 10 nm, and 20 nm was measured. The result thereof is shown in Table 4 below.

TABLE 4

| | Example 3 | Example 4 | Example 5 |
|---|---|---|---|
| Thickness of discoloration preventing layer | 5 nm | 10 nm | 20 nm |
| Average light reflectance before heat-treatment (%) | 15.66 | 13.91 | 12.55 |
| Average light reflectance after heat-treatment for 30 minutes (%) | 18.05 | 15.69 | 13.29 |
| Average light reflectance after heat-treatment for 24 hours (%) | 23.82 | 19.60 | 16.13 |
| Difference in average light reflectance before and after heat-treatment for 30 minutes | 2.38 | 1.78 | 0.74 |
| Difference in average light reflectance before and after heat-treatment for 24 hours | 8.16 | 5.69 | 3.58 |

In the case of the conductive structure bodies according to Examples 3 to 5, it is shown that the difference in the average light reflectance before and after the heat treatment for 24 hours is within 10%, so that the discoloration of the light reflection reducing layer was effectively prevented.

It can be seen from the above Examples and Comparative Examples that the increase in the average light reflectance after heat treatment may be effectively suppressed when the Ni content of the discoloration preventing layer is 50 at % or more, specifically, 57 at % or more. Further, it can be seen that the increase in the average light reflectance after heat treatment may be effectively suppressed when the Ni content of the discoloration preventing layer is 50 at % or more and the thickness of the discoloration preventing layer is 10 nm or more.

[Experimental Example 2]—Batch-Etching Characteristic Comparison

After a polyethylene terephthalate (PET) substrate was prepared, a metal layer having a thickness of 100 nm was formed on the PET substrate using Cu as a source material under an argon atmosphere of 2 mTorr. Furthermore, the conductive structure body was manufactured by forming a Cu—Ni discoloration preventing layer having the thickness of 10 nm on the metal layer by using the sputtering method under an atmosphere having oxygen of 50% and thereafter, forming the light reflection reducing layer of the copper oxide on the discoloration preventing layer.

The conductive structure body was manufactured by controlling the Ni content of the discoloration preventing layer to each of 40 at %, 50 at %, 57 at %, 72 at %, and 82 at % and thereafter, the conductive structure body was batch-etched with a sulfuric acid based etchant. The result thereof is shown in FIG. 5 below.

According to Experimental Example 2, it can be seen that when the Ni content of the discoloration preventing layer is less than 50 at %, the batch-etching is not performed, and as a result, a micro pattern is not formed. Similarly, it can be seen that when the Ni content of the discoloration preventing layer is more than 80 at %, the batch-etching is not performed, and as a result, the micro pattern is not formed.

The invention claimed is:

1. A conductive structure body comprising:
a substrate;
a metal layer including copper, which is provided on the substrate;
a discoloration preventing layer provided on the metal layer and including copper and nickel; and
a light reflection reducing layer provided on the discoloration preventing layer and including at least one of copper oxide, copper nitride, copper oxynitride, aluminum oxide, aluminum nitride, and aluminum oxynitride,
wherein a nickel content of the discoloration preventing layer is in the range of 50 at % to 80 at %,
wherein a difference between an average reflectance at a wavelength in the range of 380 nm to 780 nm on the surface of the light reflectance reducing layer after a heat-treatment at 150° C. for 24 hours and an average reflectance at the wavelength in the range of 380 nm to 780 nm on the surface of the light reflectance reducing layer before the heat-treatment is 12% or less.

2. The conductive structure body of claim 1, wherein the nickel content of the discoloration preventing layer is 57 at % to 80 at %.

3. The conductive structure body of claim 1, wherein a thickness of the discoloration preventing layer is in the range of 10 nm to 30 nm.

4. The conductive structure body of claim 1, wherein the light reflection reducing layer includes copper oxide, and an oxygen content of the light reflection reducing layer is in the range of 30 at % to 50 at %.

5. The conductive structure body of claim 1, wherein the thickness of the light reflection reducing layer is in the range of 10 nm to 100 nm.

6. The conductive structure body of claim 1, wherein the metal layer is a metal pattern layer including a plurality of openings and a conductive line partitioning the plurality of openings.

7. The conductive structure body of claim 6, wherein a line width of the metal pattern layer is in the range of 0.1 μm to 100 μm.

8. The conductive structure body of claim 6, wherein a line interval between adjacent conductive lines of the metal pattern layer is in the range of 0.1 μm to 100 μm.

9. The conductive structure body of claim 1, wherein a transparent conductive layer is further provided between the substrate and the metal layer.

10. The conductive structure body of claim 1, wherein surface resistance of the conductive structure body is in the range of 0.1 Ω/square to 100 Ω/square.

11. A method for manufacturing a conductive structure body of claim 1, the method comprising:
preparing a substrate;
forming a metal layer including copper on the substrate;
forming a discoloration preventing layer including copper and nickel on the metal layer; and
forming a light reflection reducing layer on the discoloration preventing layer.

12. The method of claim 11, further comprising:
simultaneously patterning the metal layer, the discoloration preventing layer, and the light reflection reducing layer.

13. The method of claim 12, wherein in the simultaneous patterning, the metal layer, the discoloration preventing layer, and the light reflection reducing layer are batch-etched by using an etchant.

14. A touch panel comprising a conductive structure body of claim 1.

15. A display device comprising a conductive structure body of claim 1.

16. A conductive structure body comprising:
a substrate;
a metal layer including copper, which is provided on the substrate;
a discoloration preventing layer provided on the metal layer and including copper and nickel, and a light reflection reducing layer provided on the discoloration preventing layer and including at least one of copper oxide, copper nitride, copper oxynitride, aluminum oxide, aluminum nitride, and aluminum oxynitride, wherein:
 a nickel content of the discoloration preventing layer is in the range of 50 at % to 80 at %; and
 a difference between an average reflectance at the wavelength in the range of 380 nm to 780 nm on the surface of the light reflectance reducing layer after a heat-treatment at 150° C. for 24 hours and an average reflectance at the wavelength in the range of 380 nm to 780 nm on the surface of the light reflectance reduction layer before the heat-treatment is 10% or less.

17. A touch panel comprising a conductive structure body of claim 16.

18. A display device comprising a conductive structure body of claim 16.

* * * * *